United States Patent [19]
Fischer et al.

[11] Patent Number: 4,789,053
[45] Date of Patent: Dec. 6, 1988

[54] TORSIONAL VIBRATION DAMPER

[75] Inventors: Matthias Fischer, Euerbach; Rainer Ziss, Schwanfeld, both of Fed. Rep. of Germany

[73] Assignee: Fichtel & Sachs AG, Schweinfurt, Fed. Rep. of Germany

[21] Appl. No.: 44,791

[22] Filed: Apr. 30, 1987

[30] Foreign Application Priority Data

May 2, 1986 [DE] Fed. Rep. of Germany ....... 3614824

[51] Int. Cl.⁴ ............................ F16D 3/14; F16D 3/66
[52] U.S. Cl. .................................... 192/106.2; 464/68
[58] Field of Search ............... 192/106.1, 70.17, 106.2; 464/68

[56] References Cited

U.S. PATENT DOCUMENTS

| 4,643,288 | 2/1987 | Tomm et al. | 192/106.2 |
| 4,669,595 | 6/1987 | Fischer et al. | 192/106.2 |

FOREIGN PATENT DOCUMENTS

3415927 10/1985 Fed. Rep. of Germany .

Primary Examiner—Allan D. Herrmann
Attorney, Agent, or Firm—Toren, McGeady & Associates

[57] ABSTRACT

The torsional vibration damper suitable for the clutch disc of a motor vehicle friction clutch comprises an idling damper, the springs of which are retained in recesses of a toothing which couple the hub of the damper with a disc part, with limited play in rotation. The end faces of the spring lie for the one part on stop edges of the disc part and for the other part on stop edges of two retaining discs which annularly enclose the hub. The retaining discs are coupled non-rotatably, by axial bent-out portions, with a hub disc of the hub, and for assembly are pushed axially on to the hub. The retaining discs can be produced simply and fitted without problem. FIG. 1.

11 Claims, 7 Drawing Sheets

TORSIONAL VIBRATION DAMPER

BACKGROUND OF THE INVENTION

The invention relates to a torsional vibration damper, especially for a clutch disc of a motor vehicle friction clutch.

From West German Patent Application No. 3,415,927 a torsional vibration damper for the clutch disc of a motor vehicle friction clutch is known the hub of which carries a hub disc provided with an external toothing. The hub disc forms a first disc part which is limitedly rotatably enclosed concentrically by an annular second disc part. The second disc part has an internal toothing which engages with play in rotation in the external toothing of the first disc part. Two firmly interconnected cover or side discs are arranged on mutually axially opposite sides of the disc parts, rotatably in relation thereto. The side discs are coupled through first springs with the second disc part and form an underload vibration damper. In a recess defined by two teeth of the second disc part there is seated a second spring which is seated in the circumferential direction in apertures of a substantially U-shaped stirrup-type spring retaining fitting. The spring retaining fitting in turn is seated in a recess which is formed by two teeth of the external toothing of the first disc part. The second spring seated in the spring retaining fitting is a component of an idling vibration damper.

The conventional spring retaining fitting has a form which is comparatively expensive to produce. Furthermore assembly can lead to problems, especially if the spring retaining fitting is to be used at the same time for the axial fixing of the second spring.

The invention aims at improving a torsional vibration damper of the kind as known from German Patent Application No. 3,415,927 so that the advantages achieved by the spring retaining fitting are retained but the production and assembly are facilitated.

SUMMARY OF THE INVENTION

Within the scope of the invention two retaining discs are provided for the fixing of the second springs, of which several may be present, and for force introduction into these springs, each of which discs is provided with apertures for the second spring. The two retaining discs are arranged on axially opposite sides of the two disc parts and each separately connected non-rotatably with the same disc part. The retaining discs can be produced simply, for example as sheet metal stampings, and in assembly can be pushed axially on to the hub. Axially bent-away tabs can be formed on the retaining discs for the non-rotatable connection. The tabs are especially zones of the retaining discs which in any case must be bent out of the disc plane of the retaining discs for the guidance of the second spring. The apertures of the disc part necessary in any case for the reception of the second spring will expediently again be exploited for the engagement of the tabs.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

Examples of embodiment of the invention will be explained in greater detail below.

Figure 1:
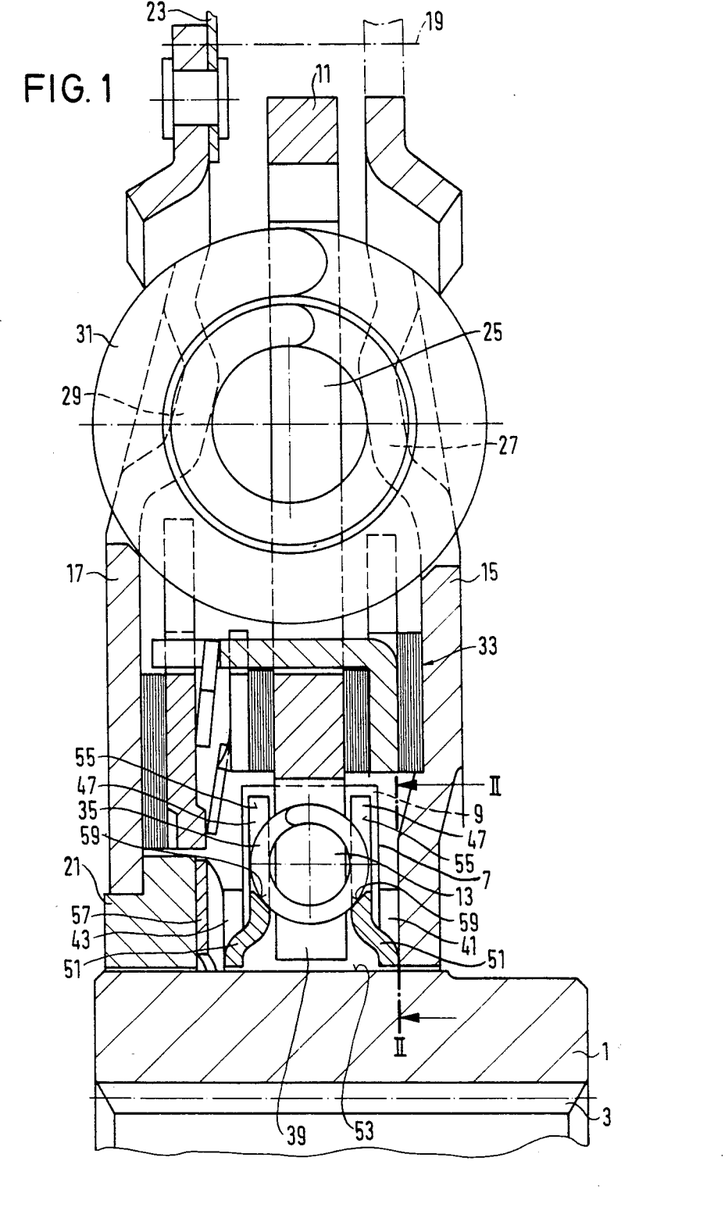
FIG. 1 shows the half of an axial longitudinal section of a torsional vibration damper of a clutch disc of a motor vehicle friction clutch.
Figures 2, 3:
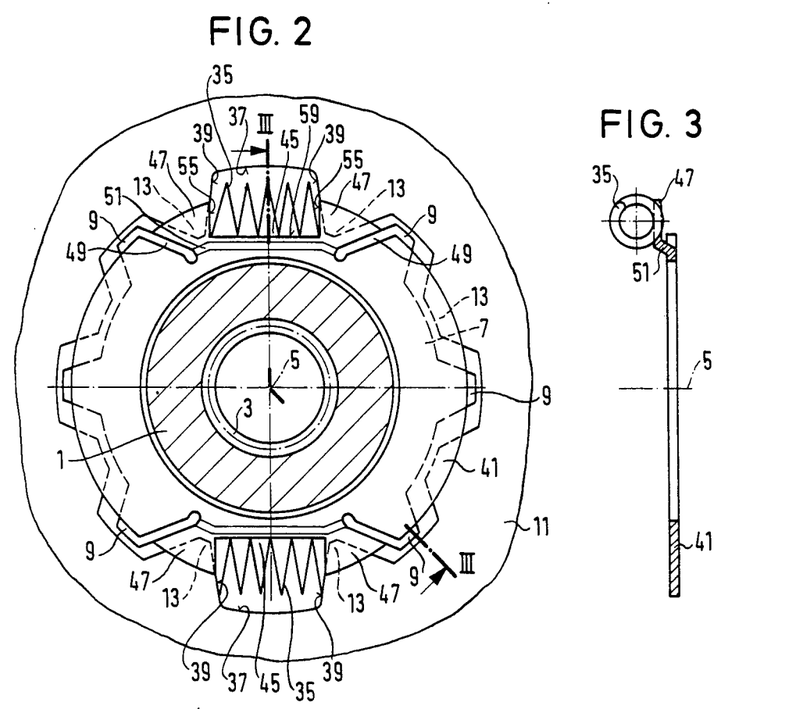
FIG. 2 shows a partial sectional view through the torsional vibration damper, seen along a line II—II in FIG. 1.
FIG. 3 shows an axial longitudinal section through a detail of the vibration damper, seen along a line III—III FIG. 2.

The torsional vibration damper of a clutch disc of a motor vehicle friction clutch as represented in FIGS. 1 and 2 has a hub 1 which can be connected by an internal toothing 3 non-rotatably but axially displaceably with a gear input shaft (not shown further) rotatable about a rotation axis 5. A hub disc 7 having teeth 9 of an external toothing on its external circumference protrudes radially from the hub 1. An annular disc part 11 limitedly rotatably encloses the hub disc 7 coaxially. The disc part 11 has an internal toothing with teeth 13 which engage in the external toothing 9 of the hub disc 7 and couple the disc part 11 with limited play in rotation, but otherwise non-rotatable, with the hub disc 7. Axially on both sides of the disc part 11 there are arranged two cover or side discs 15, 17 which are firmly connected with one another into one unit by securing means 19 (not further illustrated), for example distance rivets. The side disc 17 is mounted rotatably on the hub 1 through a bearing ring 21 and carries, in the region of its external circumference, a lining carrier 23 with clutch friction linings (not illustrated further).

Helical springs 31 are seated in windows 25 of the disc part 11 for the one part and windows 27, 29 of the side discs 15, 17 for the other part. The springs 31 are dimensioned for operation under load and couple the side discs 15, 17 elastically in rotation with the disc part 11 which in operation under load, after the taking up of the rotational play of the toothings 9, 13, is in turn connected non-rotatably with the hub 1. A friction device 33, dimensioned for operation under load, damps rotational vibrations then occurring. Vibration dampers of the kind as described above are known, for example from German patent application No. 3,415,927, and therefore are not to be explained further.

The invention is concerned especially with a vibration damper dimensioned for idling operation. This comprises at least one spring 35, but expediently two mutually diametrically opposite springs 35, which are preferably formed as helical springs and are seated in recesses 37 of the disc part 11 between two teeth 13 of the disc part 11 lying opposite to one another in the circumferential direction. The teeth 13 form stop edges 39 lying opposite to one another in the circumferential direction and resting on the end faces of the spring 35. Annular retaining discs 41, 43 which rest flat on the side faces of the hub disc or disc 7 are arranged axially on both sides of the hub disc 7. The retaining discs 41, 43 are formed as sheet metal stampings and have recesses 45 lying axially opposite to the recesses 37 of the disc part 11, which recesses 45 are limited in the circumferential direction each by two tabs 47. The tabs 47 are punched clear by slots 49 and bent axially into a recess 53 (FIG. 1) limited in the circumferential direction by two adjacent teeth 9 of the hub flange 7, by way of a cranked portion 51 extending between the slots 49 in the circumferential direction. The two teeth limiting the recess 53 in the circumferential direction enclose the teeth 13 limiting the recess 37 between them in the circumferential direction. The tabs 47 are arranged axially laterally of the teeth 13 limiting the recess 37 and form stop edges 55 opposite to one another in the circumferential direction, between which the spring 35 is seated with its end faces. The cranked formation 51 is here so selected that the tabs 47 extend with slight axial spacing from the disc part 11. With their end faces formed by the slots 49 the tabs 47 lie against the teeth 9 of the hub flange 7 which limit the recess 53 in the circumferential direction. Thus the retaining discs 41 are guided fast in rotation in the circumferential direction on the hub flange 7. In the axial direction a corrugated spring 57, acting axially and arranged between the bearing ring 21 and thus the side disc 17 on one side and the retaining disc 43 on the other side, braces the retaining disc 43 against the hub flange 7. The reaction force of the corrugated spring 57 on the other side clamps the retaining disc 41 in between the other side of the hub flange 7 and the side disc 15. For this purpose the firmly interconnected side discs 15, 17 are slightly axially displaceable on the hub 1.

The external diameter of the retaining discs 41, 43 is expediently so selected that the toothings 9, 13 are covered.

In the relative rotation in idling operation the springs 35 are compressed between the stop edges 39 on one side and 55 on the other side. The stop edges 39 here extend over the whole diameter of the springs 35, in order to achieve a uniform force introduction. The edges 59 extending between the stop edges 55, of the recesses 45 accommodating the spring 35 are bevelled in correspondence with the circumference of the spring 35 and fix the spring 35 in the axial direction. At least one of the springs 35 is seated without play between the stop edges 39, 47 and ensures a rest position of the disc part 11 in relation to the hub disc 7, out of which the disc part 11 is deflectable according to the rotational play of the toothings 9, 13 in idling operation. Since in idling operation the comparatively strong springs 31 connect the disc part 11 and the side discs 15, 17 into one unit, in idling operation the side disc 15 rotates in relation to the retaining disc 41. The friction moment occurring between these discs ensures a friction damping of the idling vibration damper.

For assembly the two retaining discs 41, 43 are merely pushed on to the hub 1, after the springs 35 have been inserted into the recesses 37 of the disc part 11.

Variants of the torsional vibration damper, which differ from the vibration damper according to FIGS. 1 and 2 merely in the configuration of the retaining discs, will be described below. Parts of like action are designated with the reference numerals according to FIGS. 1 to 3 and provided with a letter for distinction. Reference is made to the description of FIGS. 1 to 3 for the explanation of the assembly and manner of operation of the torsional vibration damper.

Figure 4:
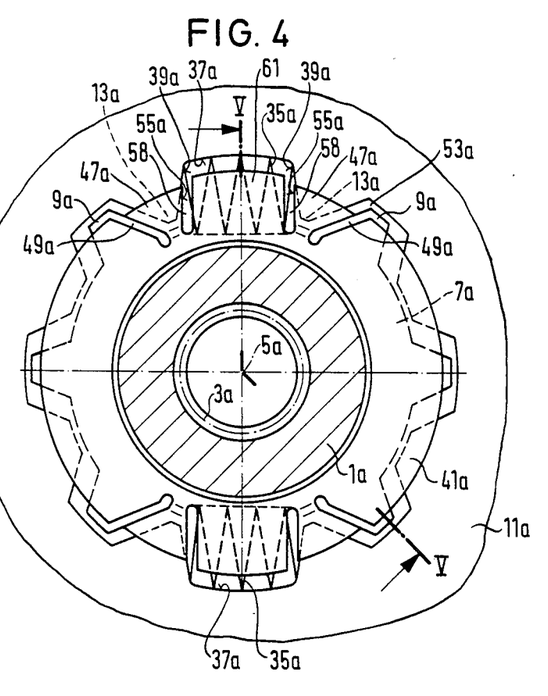
FIG. 4 shows a partial sectional view similar to FIG. 2 through a variant of the torsional vibration damper according to FIG. 1.
Figure 5:
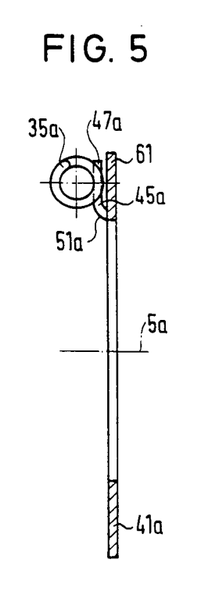
FIG. 5 shows an axial longitudinal section through a detail of the damper according to FIG. 4.

The retaining disc 41a as represented in FIGS. 4 and 5 differs merely in that the recess 45a is cut clear by slots 59, in such a way that a tab 61 covering the recess 45a remains in the plane of the annular disc and guides the spring 35a axially. Only the tabs 47a are bent in between the teeth 9a of the hub disc 7a, by the cranked portions 51a. The slots 49a and 59 are made comparatively narrow.

Figure 6:
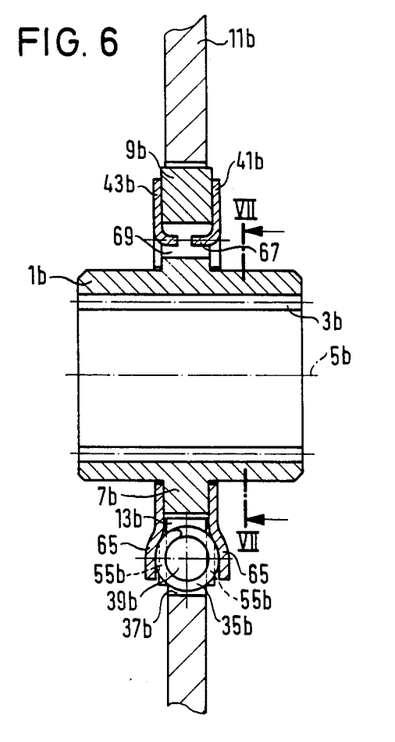
FIG. 6 shows an axial longitudinal section through a detail of a second variant of a torsional vibration damper similar to FIG. 1, seen along a line VI—VI 7.
Figure 7:
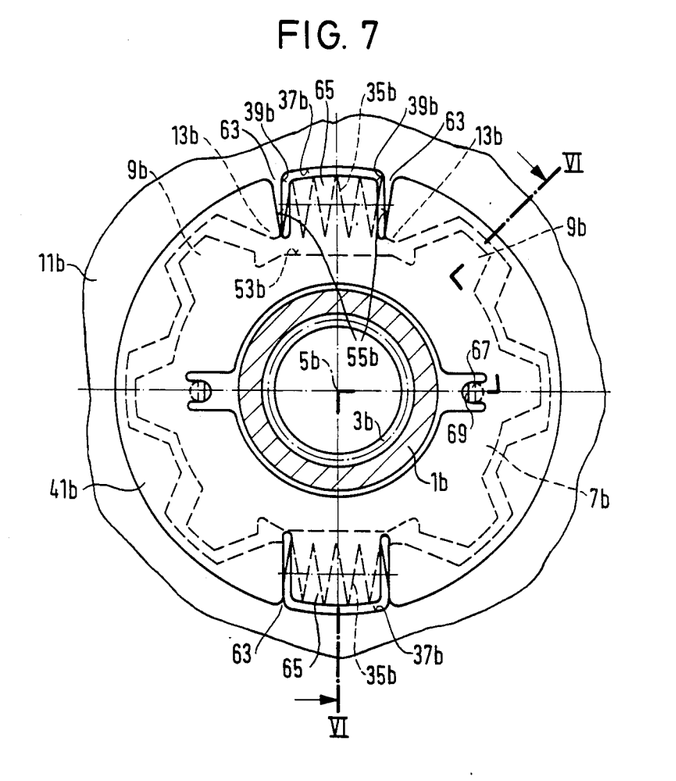
FIG. 7 a partial sectional view of the torsional vibration damper, seen along a line VII—VII in FIG. 6.

In the variant according to FIGS. 6 and 7 the retaining discs 41b, 43b are provided, on both sides of the two teeth 13b defining the recess 37b of the disc part 11b with slots 63 which by pairs clear a tab 65 between them. The tabs 65 are domed so away from the disc part 11b, in accordance with the contour of the spring 35b seated in the recess 37b, and form a recess which is defined in the circumferential direction by the slot edges 55b. The slot edges 55b lie against the end faces of the spring 35b for the compression of the latter. The tabs 65 fix the spring 35b axially, that is in the direction of the axis 5b of rotation.

For the non-rotatable connection of the retaining discs 41b, 43b with the hub disc 9b, on the retaining discs there are formed tabs 67 which are bent away towards the hub disc 9b and engage from axially opposite sides in openings 69 of the hub disc 9b. In the version according to FIGS. 6 and 7 again the retaining discs 41b, 43b can easily be fitted and can be punched from sheet metal without problem, the slots 63 expediently being made merely as incisions.

Figure 8:
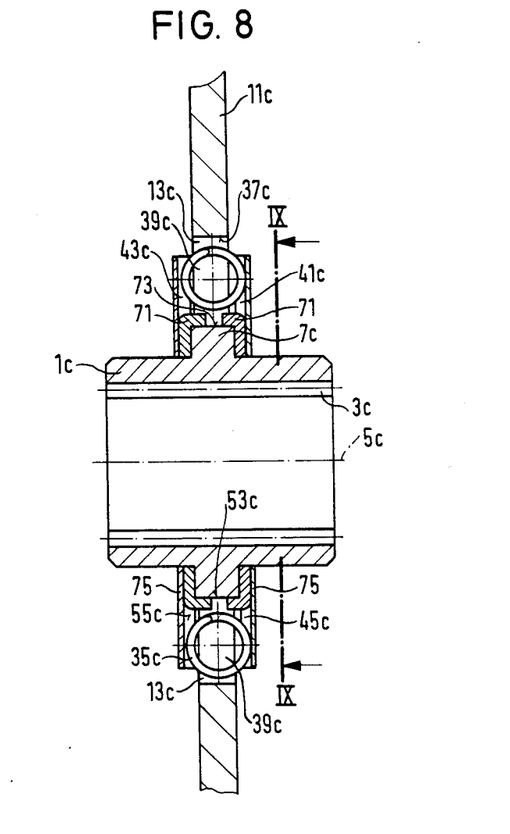
FIG. 8 shows an axial longitudinal section through a detail of a third variant of a torsional vibration damper similar to FIG. 1, seen along a line VIII—VIII in FIG. 9
Figure 9:
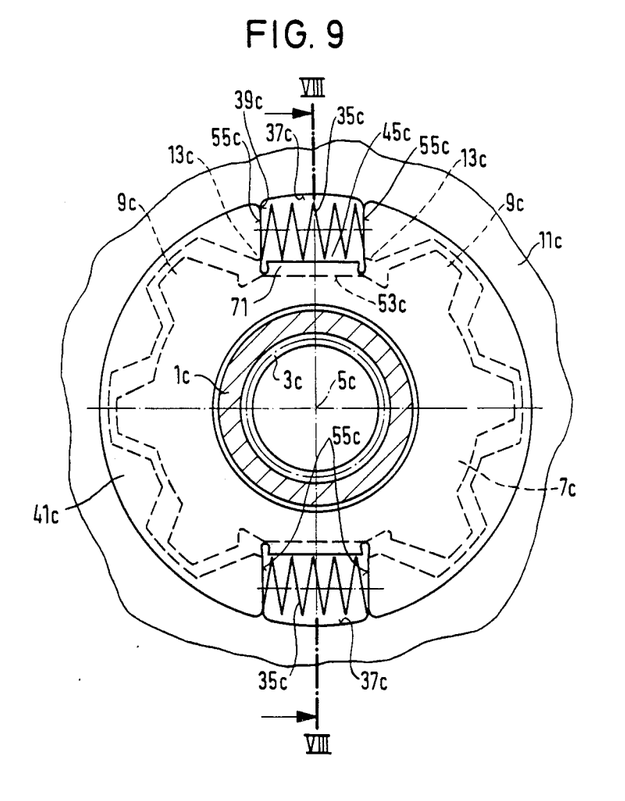
FIG. 9 shows a partial sectional view through the damper, seen along a line IX—IX in FIG. 8.

The variant as illustrated in FIGS. 8 and 9 differs from the variant according to FIGS. 6 and 7 primarily in the non-rotatable connection of the retaining discs 41c, 43c with the hub disc 7c. The tabs 71 cut clear for the formation of the abutment edges 55c in the recess 45c, intended to receive the spring 35c, of the retaining discs are bent over axially towards the hub disc 7c and engage between the two teeth 9c of the hub disc 7c which receive the spring 35c between them, in the circumferential direction. Between these teeth 9c the hub disc 7c has a flat, substantially tangentially extending surface 73 on which the tabs 71 rest substantially over the length of the spring 35c. Annular discs 75 lie against the side of the retaining discs 41c, 43c axially remote from the hub disc 7c, for the fixing of the springs 35c in the direction of the rotation axis 5c. In this variant again the torsional vibration damper can be assembled simply, the retaining discs 41c, 43c and the annular discs 75 being pushed axially on to the hub.

What I claimed is:

1. A torsional vibration damper, especially for a clutch disc of a motor vehicle friction clutch, comprising:
    (a) a hub having a radially protruding first disc part comprising an external toothing
    (b) a second disc part of annular disc form rotatably enclosing the first disc part concentrically, which second disc part comprises an internal toothing engaging with predetermined play in rotation in the external toothing of the first disc part, (c) firmly mutually connected side discs arranged on axially opposite sides of the disc parts rotatably in relation to these, (d) at least one first spring stressable in the relative rotation of the side discs and of the second disc part, (e) at least one second spring stressable in the relative rotation of the first disc part and the second, which second spring is arranged in a first recess, defined in the circumferential direction by teeth, of one of the two disc parts, which recess extends substantially over the whole radial height of the second spring and forms first abutment edges, lying opposite to one another in the circumferential direction, for the abutment on the second spring, (f) a retaining device for the second spring, which comprises two separate retaining discs arranged on axially opposite sides of the two disc parts, each of said retaining discs comprises a second recess lying axially opposite to the first recess and forming second abutment edges lying opposite to one another in the circumferential direction for the abutment on the second spring engaging in the second recess, and each of said retaining discs is separately connected non-rotatably with the other of the two disc parts and is axially fixed between the first disc part and a different one of the side discs.

2. A torsional vibration damper according to claim 1, wherein the retaining discs are formed as annular discs which concentrically enclose the hub.

3. A torsional vibration damper according to claim 2, wherein the first recess is provided in the second disc part and the annular discs rest on the first disc part.

4. A torsional vibration damper according to claim 3, wherein between one of the two sides discs and the annular disc adjacent there is arranged an axially acting annular spring which braces the other of the two side discs through the other annular disc against the first disc part.

5. A torsional vibration damper according to claim 2, wherein each of the two annular discs has for the non-rotatable connection with said other disc part at least one zone bent out of the plane of the disc, which engages in a third recess in the other disc part.

6. A torsional vibration damper according to claim 5, wherein the first recess is formed by two teeth, lying mutually oppositely in the circumferential direction, of said one disc part and the third recess is formed by teeth, lying mutually oppositely in the circumferential direction, of the other disc part, and wherein the two teeth which form the first recess engage in the third recess.

7. A torsional vibration damper according to claim 6, wherein the second recesses are limited by tabs lying oppositely to one another by pairs in the circumferential direction, which tabs form the second abutment edges and engage axially in the third recess for the non-rotatable connection with said other disc part.

8. A torsional vibration damper according to claim 7, wherein in the circumferential direction between each pair of tabs a further tab is provided which reaches radially past the second spring and axially guides the second spring.

9. A torsional vibration damper according to claim 6, wherein in the circumferential direction between the two abutment edges a tab is bent out of the second recess of the annular discs, which tab engages in the third recess for the non-rotatable connection of the annular disc with said other disc part.

10. A torsional vibration damper according to claim 5, wherein tabs are bent out of the retaining discs in the circumferential direction with spacing from the second recesses, which tabs engage in openings of said other disc part.

11. A torsional vibration damper according to claim 10, wherein radially protruding tabs are formed-on in axially staggered manner in the circumferential direction between the second abutment edges of the retaining discs, which tabs overlap with the first recess and guide the second spring axially.

* * * * *